April 19, 1966   F. DOKTER ETAL   3,247,456
DIRECTIONAL ELECTRIC TACHOMETER INCLUDING MEANS
FOR PRODUCING ASYMMETRICAL PULSES
Filed June 28, 1962   2 Sheets-Sheet 1

INVENTOR
*FOLKERT DOKTER
FRANZ SEMMEROW*
BY
AGENT

United States Patent Office 3,247,456
Patented Apr. 19, 1966

3,247,456
DIRECTIONAL ELECTRIC TACHOMETER INCLUDING MEANS FOR PRODUCING ASYMMETRICAL PULSES
Folkert Dokter, Hamburg, and Franz Semmerow, Harksheide, Germany, assignors to North American Philips Company, Inc., New York, N.Y., a corporation of Delaware
Filed June 28, 1962, Ser. No. 206,075
Claims priority, application Germany, July 21, 1961, P 27,530
7 Claims. (Cl. 324—70)

This invention relates to speed measuring devices and more particularly to a directional electric tachometer for measuring the speed and direction of rotation of a rotating shaft.

In the known electronic measurement of shaft speed, pulses are produced by a recorder, the frequency of which is proportional to the rotational speed of the shaft. The pulses are converted electronically into standard pulses having a constant energy content. After integration, a direct voltage is obtained which is proportional to the speed of rotation.

In general, measuring devices of this type have advantages as compared with conventional tachogenerators. In the first place, they have relatively little linearity deviation within the range of the speed of rotation to be measured. Furthermore, they make it possible to perform a measurement without contact with the shaft and consequently without adding undue load on the shaft.

An important disadvantage of the known tachometers, which often prevents the use of these instruments is, however, that it is not possible to distinguish between the two directions of rotation. Tachometers are known which distinguish between the directions of rotation. However, with these meters the circuit arrangement often is comparatively complicated.

In an electronic tachometer according to the invention, in which voltages derived from the rotating shaft via a rotatable member and a fixed coil are converted into voltage pulses, is characterised in that the periphery of the rotatable member is sawtooth-shaped.

As a result of this construction it is possible in a simple manner to produce pulses which are dependent upon the direction of rotation because upon rotation in one direction positive pulses are produced and upon rotation in the other direction negative pulses are produced.

Figure 1:
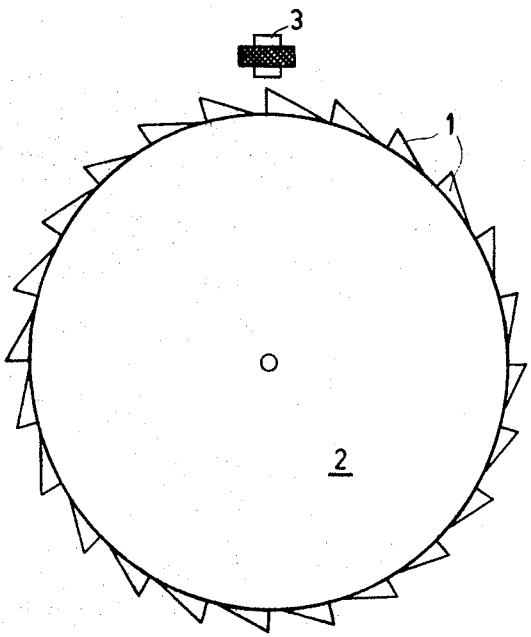
Figure 2:
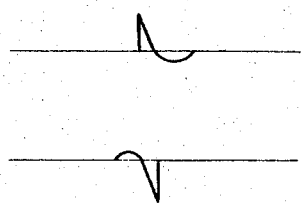
Figure 3:
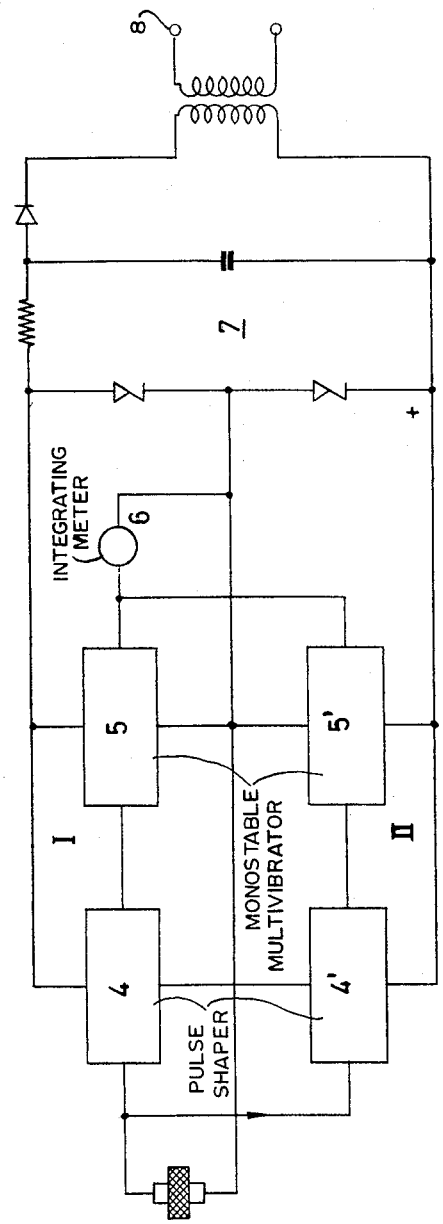

In order that the invention may readily be carried into effect, one embodiment thereof will now be described more fully, by way of example, with reference to the accompanying drawings, in which:

FIG. 1 shows the pulse generator,
FIG. 2 is a pulse diagram and
FIG. 3 is a block schematic view of the electronic tachometer.

The pulses required for controlling the measuring instrument are produced electromagnetically by iron members 1 rotating past a coil 3 mounted on a permanent magnet. In this coil voltage pulses are induced, the amplitude of these pulses being proportional to the rate of change of the magnetic flux. The polarity of the pulses induced in coil 3 also depends upon the sense of the change of the magnetic flux. Particular pulse shapes can be produced by an efficient construction of the iron members 1 according to the invention. The iron members 1, shown in FIG. 1, are provided on the rotating member 2, which in turn is coupled to the shaft to be measured. If these teeth are given a sawtooth shape, pulses are produced in the coil 3 which, in accordance with the direction of rotation, have a high negative or a high positive voltage peak. As shown in FIG. 2, the polarity of these pulses depends upon the direction of rotation of member 2. The pulses are supplied to an electronic tachometer and converted therein into corresponding direct voltages which are proportional to the frequency of rotation of member 2.

As shown in FIG. 3, this meter consists of two symmetrical channels I and II. Each of these channels comprises a pulse shaper 4 and 4′, respectively, constructed as a Schmitt trigger, followed by a monostable multivibrator 5 and 5′, respectively. Circuits suitable for use as the Schmitt trigger, 4 or 4′, are illustrated in volume 19 of the MIT Radiation Laboratory Series, entitled, "Waveforms," copyright 1949, Figs. 5–4 on page 164 or Fig. 5–36 on page 187. Monostable multivibrators suitable for use in boxes 5 and 5′ are shown at pages 166 to 171 of "Waveforms." Channel I is equipped with npn-transistors, channel II with pnp-transistors. It is achieved by this arrangement that the measurement which is dependent upon the direction of rotation can be carried out with the minimum of investment. If the coil 3, sometimes termed a trigger coil, produces a negative pulse in a particular direction of rotation, then channel I (npn-transistors) becomes operative. If, however, a positive pulse is produced, then channel II (pnp-transistors) becomes operative. Consequently, the monostable multivibrator in the channel in question produces the standard pulses required for measurement.

The integration takes place in a moving coil instrument 6. If the direction of rotation is such as to provide negative pulses in coil 3, then channel I becomes operative and the moving coil instrument 6 shows a negative deflection. For the opposite direction of rotation, positive pulses are produced in coil 3, and channel II now becomes operative causing positive deflection of moving coil instrument 6. The D.C. supply voltages may be produced in known manner by means of a stabilized rectifier circuit 7 supplied from a source of A.C. voltage connected to terminal 8.

By means of the invention, the particular advantages of an electronic tachometer are maintained with a minimum of investment, while in addition an output voltage is supplied which is dependent upon the direction of rotation.

What is claimed is:

1. A tachometer for indicating the direction of rotation and for measuring the speed of a rotating shaft, comprising a rotatable member coupled to said shaft and having a plurality of teeth composed of magnetic material located about the periphery thereof, said teeth having a first edge which diverges sharply from the surface of said rotatable member and a second edge which diverges more gradually from said surface, a coil positioned adjacent the periphery of said rotatable member in magnetic coupling relationship with said teeth thereby to induce voltage pulses therein having a non-symmetrical wave form and negative and positive excursions of different amplitude value, the polarity of the greater amplitude excursion being determined by the direction of rotation of said shaft, and indicating means coupled to said coil comprising means for converting said voltage pulses into a direct current voltage having a polarity determined by the polarity of the greater amplitude excursion.

2. A tachometer for indicating the direction of rotation and for measuring the speed of a rotating shaft, comprising a rotatable member coupled to said shaft, the periphery of said rotatable member comprising a plurality of sawtooth shaped teeth composed of magnetic material and having a first edge which diverges sharply from the surface of said rotatable member and a second edge which diverges more gradually from said surface, a coil positioned adjacent the periphery of said rotatable member in magnetic coupling relationship with said teeth thereby inducing voltage pulses in said coil upon rotation of said member, said induced pulses having a non-symmetrical waveform and negative and positive excursions of different amplitude value, the polarity of the greater amplitude excursion being determined by the direction of rotation of said shaft, and indicating means coupled to said coil for converting said voltage pulses into a direct current voltage having a polarity determined by the polarity of the greater amplitude excursion.

3. A tachometer for indicating the direction of rotation and for measuring the speed of a rotating shaft, comprising a rotatable member coupled to said shaft, the periphery of said rotatable member comprising a plurality of uniformly spaced sawtooth shaped teeth composed of magnetic material and having a first edge which diverges sharply from the surface of said rotatable member and a second edge which diverges more gradually from said surface, a permanent magnet having a coil mounted thereon positioned adjacent the periphery of said rotatable member in magnetic coupling relationship with said teeth thereby inducing voltage pulses in said coil upon rotation of said member, said induced pulses having a non-symmetrical waveform and negative and positive excursions of different amplitude value, the polarity of the greater amplitude excursion being determined by the direction of rotation of said shaft, and circuit means coupled to said coil for deriving unipolar voltage pulses having a polarity determined by the polarity of the greater amplitude excursion.

4. A tachometer for indicating the direction of rotation and for measuring the speed of a rotating shaft, comprising a rotatable member coupled to said shaft, the periphery of said rotatable member comprising a plurality of uniformly spaced sawtooth shaped teeth composed of magnetic material and having a first edge which diverges sharply from the surface of said rotatable member and a second edge which diverges more gradually from said surface, a permanent magnet having a coil mounted thereon positioned adjacent the periphery of said rotatable member in magnetic coupling relationship with said teeth thereby inducing voltage pulses in said coil upon rotation of said member, said induced pulses having a non-symmetrical waveform and negative and positive excursions of different amplitude value, the polarity of the greater amplitude excursion being determined by the direction of rotation of said shaft, circuit means comprising a first and a second channel coupled to said coil for receiving said voltage pulses, said first channel comprising means responsive only to positive voltage pulses above a given amplitude value for producing voltage pulses of one polarity, said second channel comprising means responsive only to negative voltage pulses above a given amplitude value for producing voltage pulses of the opposite polarity, and an integrating meter coupled to said first and second channels and responsive to said voltage pulses comprising means for integrating said pulses over a given time interval thereby to produce a direct current voltage having a polarity determined by the polarity of the greater amplitude excursion.

5. Apparatus as described in claim 4 wherein each of said channels comprises pulse shaping means coupled to said coil and a monostable trigger circuit coupled to said pulse shaping means for producing unipolar pulses, and means coupling said trigger circuit of each channel to said integrating meter.

6. Apparatus as described in claim 5 wherein one of said channels comprises PNP transistors as the active elements and the other channel comprises NPN transistors, the selective response of said first and second channels to the pulses produced in said coil being determined by the type of transistors used in said channel.

7. A tachometer for indicating the direction of rotation and for measuring the speed of a rotating shaft rotatable in either direction, comprising a rotatable member mounted on said shaft and having a plurality of uniformly spaced teeth located about the periphery and composed of magnetic material, a permanent magnet having a coil mounted thereon positioned adjacent the periphery of said rotatable member and forming a magnetic path with said teeth, said teeth being shaped so that upon rotation of said teeth past said magnet a sharp increase in the reluctance of said magnetic path occurs followed by a more gradual decrease in reluctance of said magnetic path thereby inducing voltage pulses in said coil having a non-symmetrical waveform and negative and positive excursions of different amplitude value, the polarity of the greater amplitude excursion being determined by the direction of rotation of said shaft, and indicating means coupled to said coil comprising means for converting said voltage pulses into a direct current voltage having a polarity determined by the polarity of the greater amplitude excursion.

References Cited by the Examiner
UNITED STATES PATENTS 2,922,943 1/1960 Rupp _____ 310—46
2,962,658 11/1960 Trexler _____ 324—70

OTHER REFERENCES

"Speed Indicator Has Expanded Scale" (P. J. Pollard), Electronics, dated May 1, 1957.

WALTER L. CARLSON, Primary Examiner.

FREDERICK M. STRADER, Examiner.